Jan. 7, 1941.  F. A. WARREN ET AL  2,227,773

FURNACE

Filed March 13, 1939  3 Sheets-Sheet 1

Inventors:
Frank A. Warren
and Jessie D. Whitcraft,

By F. G. Fischer, Attorney.

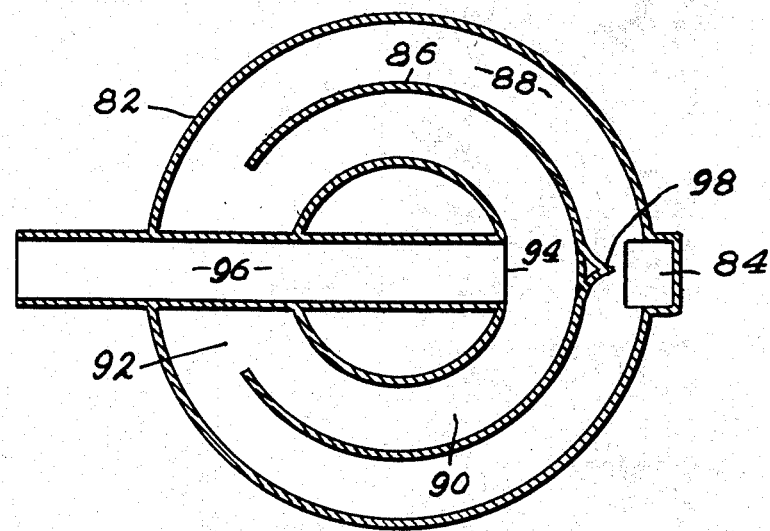
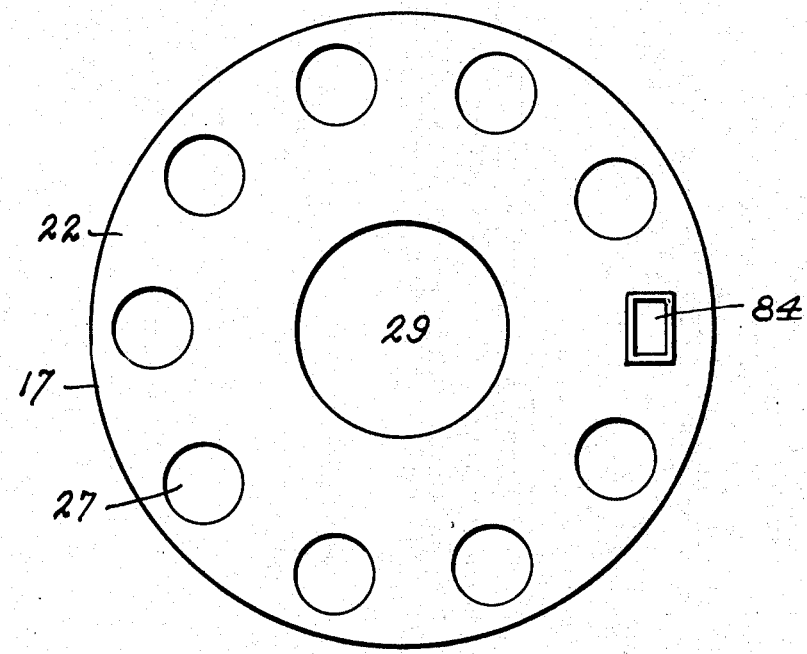

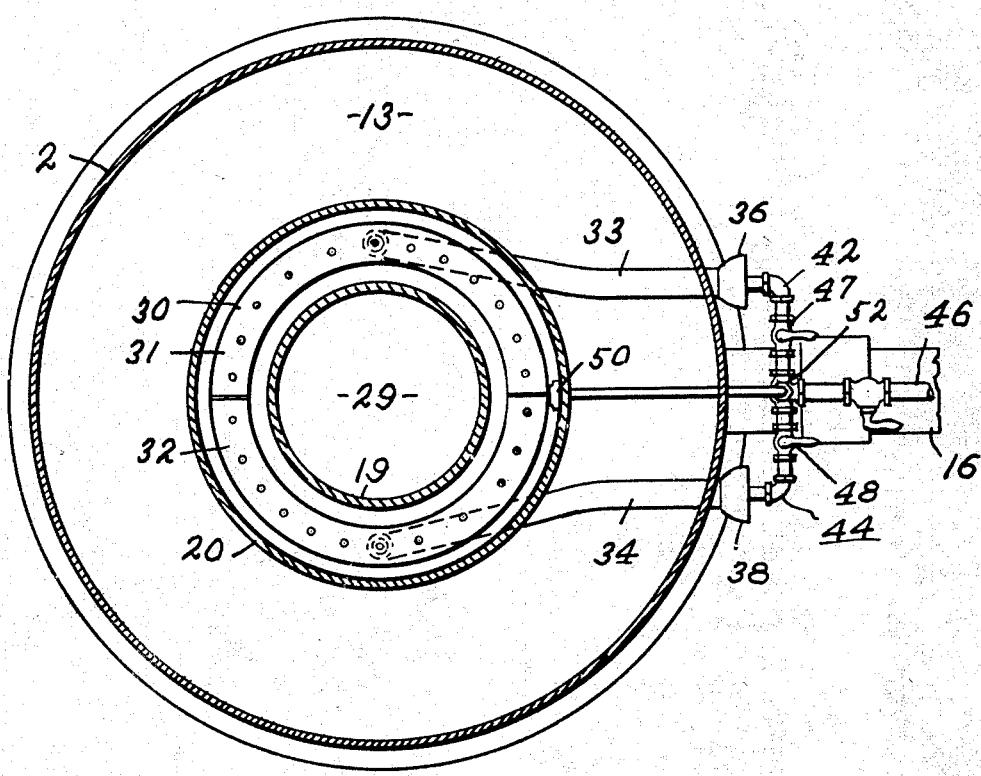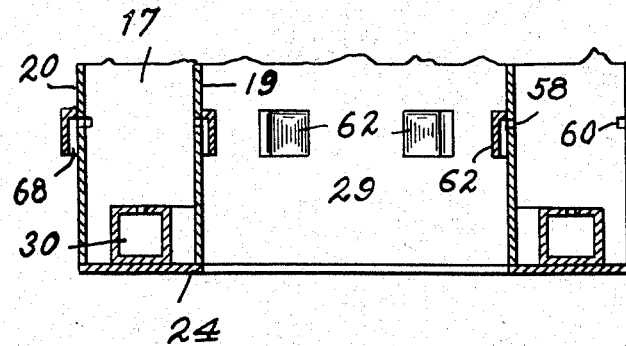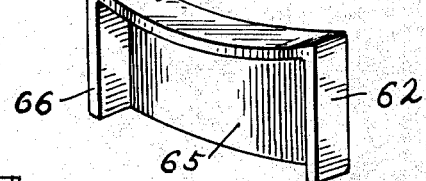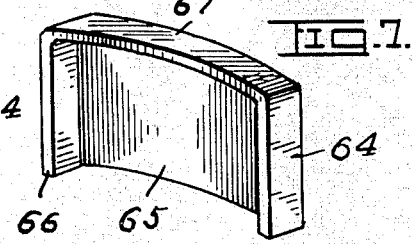

Patented Jan. 7, 1941

2,227,773

UNITED STATES PATENT OFFICE 2,227,773

FURNACE

Frank A. Warren and Jessie D. Whitcraft, Kansas City, Mo.

Application March 13, 1939, Serial No. 261,568

1 Claim. (Cl. 126—116)

Our invention relates to furnaces and one object is to provide a highly efficient furnace whereby air may be economically heated to a comfortable temperature and distributed through pipes to the different rooms of a house to heat and ventilate the same during cold weather.

A further object is to provide a fan or equivalent means for forcing a large volume of air into the furnace to be heated for distribution during the winter months, or for cooling and ventilating the rooms during the summer months.

Other objects are to provide means for deflecting a portion of the air into the combustion chamber so that it will come directly into contact with the flames from the burner and thus become instantaneously heated to a high degree to effect more complete combustion of the gases and noxious fumes and effect greater economy in the consumption of fuel; to provide a large volume of highly heated air to increase the radiating efficiency of the combustion chamber, and to provide a combustion chamber having a large radiating surface so that the large volume of highly heated air flowing therethrough may be utilized to the best advantage in heating air passing through the hot air chamber of the furnace to the distributing pipes leading to the various rooms.

In order that the invention may be fully understood, reference will now be had to the accompanying drawings, in which:

Fig. 2 is a detail horizontal sectional view of the furnace radiator taken on line 2—2 of Fig. 1.

Fig. 3 is a detail plan view of the combustion chamber.

Fig. 4 is a horizontal sectional view of the furnace on line 4—4 of Fig. 1.

Fig. 5 is an enlarged fragmentary vertical section of the lower portion of the combustion chamber with the deflectors associated therewith.

Fig. 6 is an enlarged detail of one of the deflectors.

Fig. 7 is an enlarged detail of another deflector.

Figure 1:
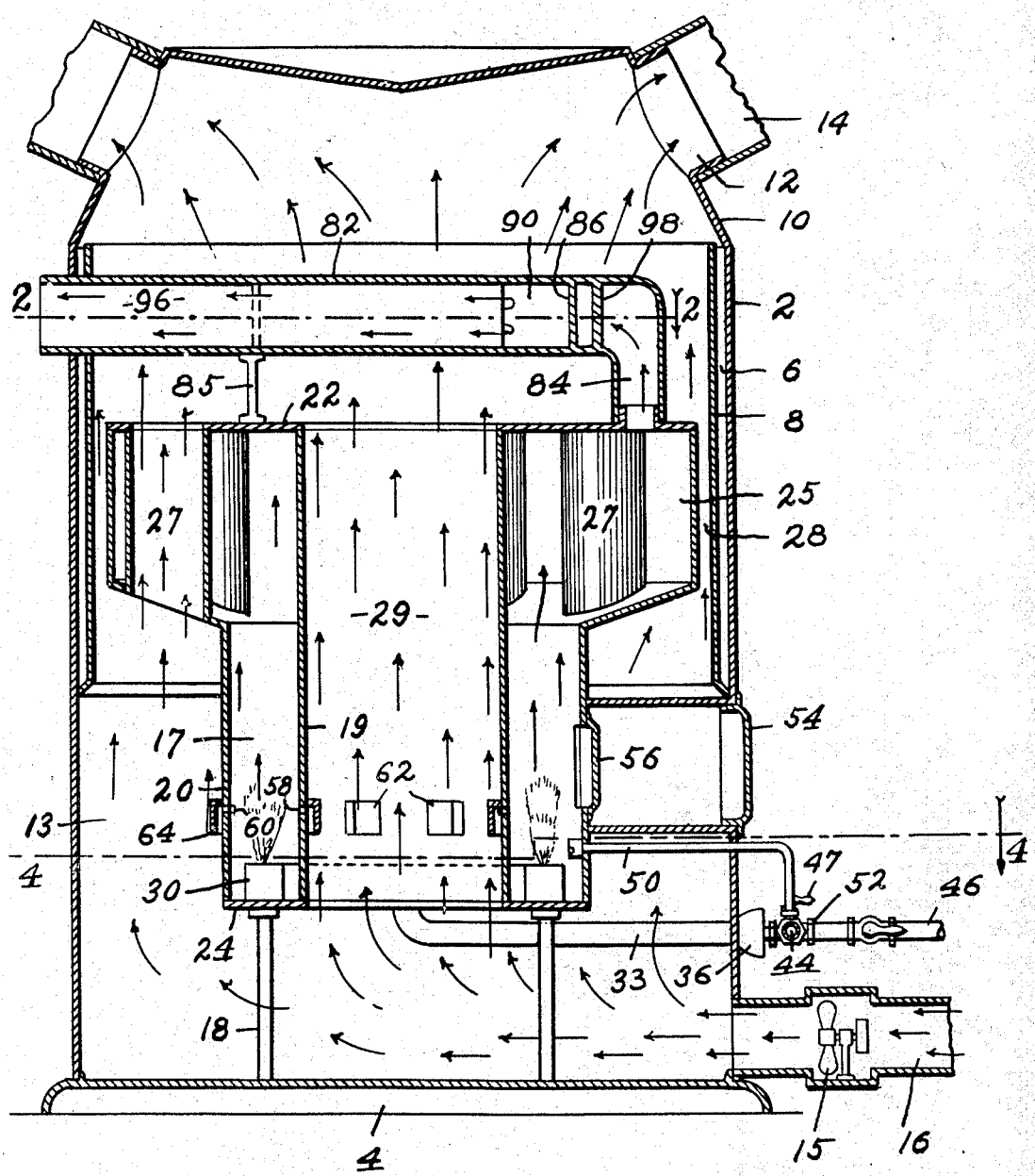
Fig. 1 is a vertical sectional view of a furnace embodying our invention.

Referring in detail to the different parts, 2 designates the housing of the furnace which rests upon a base 4 and is insulated with a dead air space 6 formed between the housing 2 and a cylindrical wall 8 spaced inwardly a short distance from said housing and terminating at its lower end in an outturned circumferential flange which fits snugly against the inner surface of housing 2. The upper portion 10 of the housing is of substantially frusto-conical form and provided with a plurality of outlets 12 through which air from the hot air chamber 13 of the furnace enters the respective distributing pipes 14 which conduct it to the various rooms of a house or building. Air taken either from the house or the outside is forced into the hot air chamber 13 with a suitably driven fan 15 which receives the air through a conduit 16 connected at its discharge end to the lower portion of the furnace.

The combustion chamber 17 of the furnace is located in the hot air chamber 13 and supported above base 4 upon suitable means such as pedestals 18. The combustion chamber comprises an annular inner wall 19, an annular outer wall 20 arranged concentrically with and spaced from said inner wall 19, and annular plates 22 and 24 closing the upper and lower ends, respectively, of the space between said walls. As shown by Fig. 1 the walls 19 and 20 are vertically disposed and of equal length.

The radiating capacity of the combustion chamber 17 is increased by enlarging its upper portion 25 diametrically and providing the same with a plurality of vertical air ducts 27 through which a portion of the hot air may flow in its passage to the outlets 12. Portions of the hot air also circulate upward through an annular space 28 between the inner wall 8 and the enlarged portion 25 of the combustion chamber, and through the large vertical opening 29 extending centrally through the combustion chamber and communicating at its lower and upper ends with the hot air chamber 13, as shown by arrows on Fig. 1.

The lower portion of the combustion chamber 17 is equipped with an annular gas burner 30 comprising a pair of independent sections 31 and 32 supplied separately with gaseous fuel through branch pipes 33 and 34, air mixers 36 and 38, branch pipes 42 and 44, respectively, and a valve controlled feed pipe 46 leading from a source of supply. The branch pipes 42 and 44 are equipped with suitable valves 47 and 48, respectively, whereby the flow of gas therethrough may be regulated as desired and so that during mild weather the fuel may be cut off from either section of the burner 30.

The fuel discharged from the two burner sections 31 and 32 is ignited with flames from both sides of a pilot burner 50 connected to a 4-way coupling 52 whereby the pipes 42, 44 and 46 are united. Access to the pilot burner 50 is had through the main furnace door 54, and a supplemental door 56 with which the adjacent portion of the outer wall 20 of the combustion chamber 17 is provided.

In order to insure the flow of a large volume of highly heated air through the combustion chamber 17 to enhance its radiating efficiency, air is admitted to the interior thereof from the hot air chamber 13 through a plurality of ports 58 and 60 formed in the inner and outer walls 18 and 20, respectively. All of said ports are located high enough to eliminate any danger of the incoming air blowing out the flames from the burner 30 or the pilot burner 50. The air is directed with individual deflectors 62 and 64 through the ports 58 and 60, respectively, and into the flames from the burner 30. Thus the air becomes instantaneously heated to such high degree as to insure more complete combustion and greater economy in the use of fuel.

Each deflector is fixed to the adjacent wall of the combustion chamber and comprises a curved plate 65 having two vertical flanges 66 and a top flange 67 which fit snugly against the associated wall and space the curved plate 65 from said wall to leave an air duct 68 which communicates with the associated port 58 or 60. The top flange 67 extends at right angles to the curved plate 65 and vertical flanges 66 to direct the air transversely against the flame of the burner 30.

As the large volume of highly heated gas flows upward through the combustion chamber 17 it heats the air in the hot air chamber 13 through the walls of the combustion chamber and enters the forward portion of an annular radiator 82 through a pipe connection 84 which cooperates with a member 85 in supporting the radiator above the combustion chamber. The interior of the radiator 82 is divided by means of a segmental baffle 86 into inner and outer concentric passageways 88 and 90, Fig. 2. The outer passageway 88 communicates at its forward portion with the pipe connection 84 and the inner passageway 90 communicates with the passageway 88 through an opening 92 arranged diametrically opposite the pipe connection 84. The passageway 90 also communicates with an opening 94 arranged diametrically opposite the opening 92 and communicating with the forward end of a transverse flue 96 which extends rearwardly through the opening 92 and leads to a stack, not shown. As the hot gas enters the passageway 88 it is equally divided and caused to flow in opposite directions by means of a V-deflector 98 fixed to the baffle 86 at a point immediately opposite the inlet connection 84. By thus providing a circuitous path for the hot gas to traverse it is evident that most of the heat is utilized for the purpose of radiation instead of escaping to the stack.

From the foregoing it will be understood that we have provided a furnace possessing the advantages above pointed out, and while we have shown a preferred form of our invention we reserve all rights to such other forms and modifications thereof as properly fall within the spirit and scope of the invention as claimed.

Having thus described our invention, what we claim and desire to secure by Letters Patent, is:

In a furnace, a base, a housing resting upon said base, a combustion chamber arranged in said housing above the base comprising inner and outer annular walls separated by an annular space closed at its upper and lower ends with annular plates, an outlet in the upper plate for escape of the products of combustion, an annular gas burner arranged in said combustion chamber and resting upon the lower annular plate, a plurality of air ports arranged in a horizontal plane in the inner and outer annular walls a short distance above the burner, and individual deflectors for directing air into the combustion chamber through the respective air ports, each deflector comprising a curved plate having two vertical flanges and a top flange fitted snugly against the adjacent annular wall and extending at right angles to said curved plate and vertical flanges for directing the air transversely against the flame of the burner.

FRANK A. WARREN.
JESSIE D. WHITCRAFT.